(No Model.)
G. J. STANHOPE & E. B. ESTY.
FIRE ESCAPE.
No. 359,643. Patented Mar. 22, 1887.
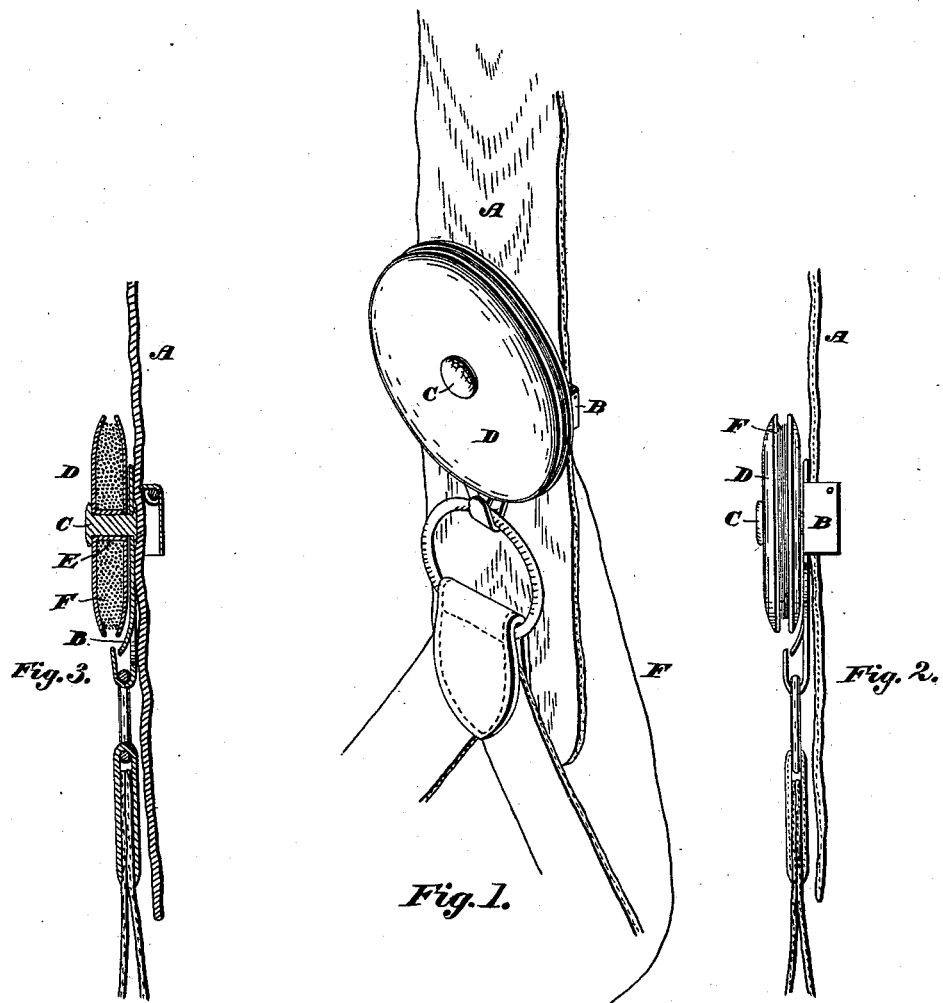
Fig. 1. Fig. 2. Fig. 3. Fig. 4.
WITNESSES:
Harry Frease
Attee Pomerene
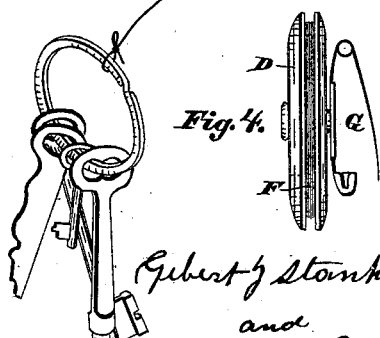
INVENTORS
Gilbert J. Stanhope
and
Ezra B. Esty
By W. K. Miller ATTORNEY.

UNITED STATES PATENT OFFICE.

GILBERT J. STANHOPE AND EZRA B. ESTY, OF CLEVELAND, OHIO.

FIRE-ESCAPE.

SPECIFICATION forming part of Letters Patent No. 359,643, dated March 22, 1887.

Application filed October 15, 1886. Serial No. 216,326. (No model.)

*To all whom it may concern:*

Be it known that we, GILBERT J. STANHOPE and EZRA B. ESTY, citizens of the United States, and residents of Cleveland, county of Cuyahoga, State of Ohio, have invented a new and useful Improvement in Fire-Escapes, of which the following is a full, clear, and exact description, reference being had to the accompanying drawings, making part of this specification.

Our invention relates to improvement, in the means of providing an escape from fire; and it consists of the means hereinafter shown and described.

Our invention also relates to the detail and combination of parts, as described and set forth in the claims.

Figure 1 is an isometrical view of our improvement as applied to a pantaloons-suspender, with bunch of keys attached. Fig. 2 is a side elevation showing the cord, spool, and suspender-buckle attached to suspender. Fig. 3 is a sectional view of the same. Fig. 4 is a side view showing the spool provided with a safety-pin, by which it may be attached to the clothing of a person.

Similar letters of reference indicate corresponding parts in all of the figures of the drawings hereunto attached.

Letter A represents a pantaloons suspender, and B a suspender-buckle, which may be of any of the well-known and approved forms. To the said buckle there is attached a pivot, C, upon which there is loosely mounted a spool, D, which may be made of any suitable plate metal, cut into disks of about one and one-half inch in diameter, having a central perforation of about one-fourth of an inch in diameter, and stamped or spun, so as to give the disks a slight concavo-convex form, as shown in Fig. 3. Through the central perforations, hereinbefore referred to, there may be passed a piece of tube, E, adapted to the size of the rivet, and about one-fourth inch long, and to which the disks may be soldered, forming a spool, as shown in the drawings, with the outer edges slightly turned in.

Upon the spool D there may be wound a silken cord, F, of about one-sixteenth of an inch in diameter and from seventy-five to one hundred feet in length, and capable of sustaining a weight of about twenty pounds. The outer edges of the spool are drawn in to protect the cord from wear or other harm. The spool, with the cord wound upon it, as stated, is worn upon or attached to the suspender-buckle for the purpose of convenience, and to be always at hand and ready for use in case of need, or may be attached to the suspender above the buckle by the use of the safety-pin shown in Fig. 4, or may be attached to other parts of the dress, and may be used as follows: In case of a fire and the need of an escape the ever-ready silken cord may be lowered by attaching a key or pocket-knife to the end thereof and dropped to the ground. By this cord a rope may be drawn up, or such other means as may render escape possible.

Having thus fully described the nature and object of our invention, what we claim, and desire to secure by Letters Patent, is—

1. As a means of providing an escape from fire, the combination of the spool D, cord F, and buckle B, substantially as described, and for the purpose set forth.

2. The combination of the spool D, cord F, buckle B, and suspender A, substantially as described, and for the purpose set forth.

3. The combination, with the pair of concaved disks centrally perforated and connected together by a short sleeve, adapted to rotate on a pivot, of a central pivot, and means secured thereto for attaching the device to a garment, substantially as set forth.

In testimony whereof we have hereunto set our hands this 12th day of October, A.D. 1886.

GILBERT J. STANHOPE.
EZRA B. ESTY.

Witnesses:
GRACE W. BRAGGINS,
HIRAM SEARS.